United States Patent
Narayan

(12) 
(10) Patent No.: US 6,232,433 B1
(45) Date of Patent: May 15, 2001

(54) RADIATION CURABLE POLYESTERS

(75) Inventor: Ramesh Narayan, Bensalem, PA (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 08/958,878

(22) Filed: Oct. 27, 1997

Related U.S. Application Data

(63) Continuation-in-part of application No. 08/720,739, filed on Oct. 2, 1996, now abandoned.

(51) Int. Cl.$^7$ .................................................. C08G 63/00
(52) U.S. Cl. .................. 528/295.3; 528/272; 528/295.3; 528/295.5; 528/300
(58) Field of Search ................................. 528/272, 295.3, 528/295.5, 300, 301, 302, 308; 522/6; 524/81

(56) References Cited

U.S. PATENT DOCUMENTS

| | | | |
|---|---|---|---|
| 3,952,032 | * 4/1976 | Vrancken et al. . | |
| 4,082,710 | 4/1978 | Vrancken et al. | 260/23 |
| 4,328,325 | 5/1982 | Marquardt et al. | 525/451 |
| 4,810,757 | 3/1989 | Hardiman et al. | 525/306 |
| 4,820,745 | 4/1989 | Mueller et al. | 522/90 |
| 4,822,829 | 4/1989 | Mueller et al. | 522/90 |
| 4,876,384 | 10/1989 | Higbie et al. | 560/224 |
| 4,910,281 | 3/1990 | Johnson | 528/75 |
| 4,978,465 | * 12/1990 | Sturwold | 252/48.4 |
| 4,983,712 | 1/1991 | Meixner et al. | 528/272 |
| 5,096,938 | 3/1992 | Beck et al. | 522/100 |
| 5,138,027 | 8/1992 | Van Beek | 528/339.3 |
| 5,502,101 | * 3/1996 | Schwarte et al. | 524/460 |
| 5,510,453 | 4/1996 | Kressdorf et al. | 528/306 |
| 5,599,785 | * 2/1997 | Mondin et al. | 510/417 |
| 5,616,781 | * 4/1997 | Sajic et al. | 510/221 |
| 5,635,554 | * 6/1997 | Boeckh et al. | 524/377 |

FOREIGN PATENT DOCUMENTS

| 0 350 730 | 1/1990 | (EP) . |
|---|---|---|
| 0 574 776 | 12/1993 | (EP) . |

OTHER PUBLICATIONS

Derwent Patent Abstract (WPAT) 93–407170/51.
Derwent Patent Abstract (WPAT) 90–016086/03.
"Coatings," *Encyclopedia of Polymer Science and Engineering*, Supp. vol., p. 109 and 110 (John Wiley & Sons, Inc., NY, NY 1989).
*Encyclopedia of Polymer Science and Engineering*, vol. 11, pp. 476–489, (John Wiley & Sons, Inc., NY, NY 1988).
*Encyclopedia of Polymer Science and Engineering*, vol. 6, pp. 225–273 (John Wiley & Sons, Inc., NY, NY 1986).
"Acrylic and Methacrylic Acid Polymers," *Encyclopedia of Polymer Science and Engineering*, vol. 1, pp 211–234 (John Wiley & Sons, Inc., NY, NY 1985).

* cited by examiner

Primary Examiner—Samuel A. Acquah
(74) Attorney, Agent, or Firm—John E. Drach; John Daniel Wood; Henry E. Millson, Jr.

(57) ABSTRACT

A composition comprising the reaction product of:
  a) a polycarboxylic member selected from the group consisting of polycarboxylic acids comprised of a diacid having more than about 12 carbon atoms and reactive derivatives thereof (e.g. alkyl esters thereof wherein the alkyl group has from 1 to 4 carbon atoms),
  b) an ethylenically unsaturated member selected from the group consisting of ethylenically unsaturated monocarboxylic acids and reactive derivatives thereof, (e.g. alkyl esters thereof wherein the alkyl group thereof has from 1 to 4 carbon atoms), and
  c) an ethoxylated alkanetriol having an average degree of ethoxylation per hydroxyl of less than about 2 and comprised predominantly of ethoxylated alkanetriol species having one ethoxylate group per hydroxyl. This composition is useful as a polymerizable component, particularly for UV curable coatings and inks.

30 Claims, No Drawings

RADIATION CURABLE POLYESTERS

This application is a continuation-in-part of Ser. No. 08/720,739 filed Oct. 2, 1996 now abandoned.

FIELD OF THE INVENTION

The present invention relates to radiation curable polyesters, to polymerizable compositions, and to methods of coating.

BACKGROUND OF THE INVENTION

The technology for the production radiation curable coatings using acrylate-functional oligomers is known. The article "Coatings", Encyclopedia of Polymer Science and Engineering, supp. vol., p. 109 and 110 (John Wiley & Sons, Inc. N.Y., N.Y., 1989) notes the most widely used vehicle systems are oligomers substituted with multiple acrylate ester groups mixed with low molecular weight monofunctional, difunctional, or trifunctional acrylate monomers.

SUMMARY OF THE INVENTION

This invention relates to a composition comprising the esterification reaction product of:
  a) a polycarboxylic member selected from the group consisting of polycarboxylic acids comprised of a diacid having more than about 12 carbon atoms and reactive derivatives thereof (e.g. alkyl esters thereof wherein the alkyl group has from 1 to 4 carbon atoms),
  b) an ethylenically unsaturated member selected from the group consisting of ethylenically unsaturated monocarboxylic acids and reactive derivatives thereof, (e.g. alkyl esters thereof wherein the alkyl group thereof has from 1 to 4 carbon atoms), and
  c) an ethoxylated alkanetriol having an average degree of ethoxylation per hydroxyl of less than about 2 and comprised predominantly of ethoxylated alkanetriol species having one ethoxylate group per hydroxyl.

This invention also relates to a polymerizable composition comprising a compound as set forth above and to a method of coating a substrate comprising polymerizing a composition comprised of the compound set forth above while in contact with a substrate.

Broadly speaking, these polyesters are prepared by forming a mixture of a polycarboxylic acid or reactive derivative, an ethylenically unsaturated acid or derivative thereof, and an ethoxylated alkanetriol. The equivalent ratios of the acid groups to hydroxyl groups of the reactants should be roughly unitary so that the reaction product is predominantly comprised of species which have no free acid or hydroxyl functionality (or in the case of the use of a lower alkyl ester of a polycarboxylic acid or ethylenically unsaturated acid, no residual lower alkyl ester functionality). Further, it is preferred to use an equivalent ratio of polycarboxylic acid-:ethylenically unsaturated acid:ethoxylated alkanetriol of roughly 1:2:3. Thus, the predominant product of the reaction should be the product of "capping" the diacid at each end with the ethoxylated alkanetriol and reaction of the remaining hydroxyl groups of the ethoxylated alkanetriol with the ethylenically unsaturated acid. However, the reaction product will be a complex mixture which is further comprised of higher oligomers and unreacted or partially reacted acids and ethoxylated alkanetriols.

DETAILED DESCRIPTION OF THE INVENTION

The polycarboxylic acid, and particularly the diacid thereof, should have the hydrophobic character of a higher fatty acid. Thus, it preferably contains polycarboxylic species having from about 12 to about 90 carbons atoms and more preferably from about 18 to about 54 carbon atoms. The polycarboxylic acid radical may be saturated or unsaturated and straight or branched. In addition to the diacid having more than about 12 carbon atoms, it typically also contains species having from 1 to 6 and more typically from 1 to 4 carboxyl groups. Instead of the free acid, it is also possible to use functional derivatives, such as acid halides, anhydrides, esters, salts or the like. Typically at least about 80 eq. % of the acid equivalents of the polycarboxylic acid will be contributed by the diacid, more typically at least about 90 eq. %, and most typically at least about 92 eq. % to about 98 eq. %.

Preferred diacids having a higher alkylene chain are described in Encyclopedia of Polymer Science and Technology, vol. 11, pp. 476–489, (John Wiley & Sons, Inc. N.Y., N.Y., 1988), the disclosure of which is incorporated herein by reference. Such preferred diacids include dimer acids (produced by the polymerization of fatty acids, e.g. oleic acid that results in a diacid which is a divalent hydrocarbon having 36 carbon atoms), tridecanedioc acid (produced by the ozonolysis of erucic acid), C19 diacid (produced by the hydroformylation of oleic acid with carbon monoxide) and C21 diacid (produced by the reaction of tall oil fatty acid with acrylic acid). The preferred diacids are dimer acids. Dimer acids are also described in detail in U.S. Pat. No. 5,138,027 (Van Beek), the disclosure of which is incorporated herein by reference.

The term "polymerized fatty acid" is intended to be generic in nature and to refer to polymerized acids obtained from fatty acids, the composition including predominantly dimerized fatty acids, with minor amount of trimerized fatty acids and residual monomeric fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms. While specific references are made in this application to polymerized fatty acid which are obtained from C18 fatty acids, it will be appreciated that the methods of this invention can likewise be employed with other polymerized fatty acids.

The preferred starting acids for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the poly-merized C18 tall oil fatty acids which are used as the starting materials for the polymerized acids which can be used in the present invention is:

C18 monobasic acids (monomer) 0–15% by wt.
C36 dibasic acids (dimer) 60–95% by wt.
C54 (or higher) trimer acid or polybasic acids 0.2–35% by wt.

In preparing polymerized fatty acids for use in the present invention, it is preferable that the starting polymerized fatty acid contains as high a percentage as possible of the dimer (C36 dibasic) acid, e.g. at least about 90% by wt., in order to obtain optimum physical properties in the final product.

In addition to the polymerized fatty acids, a wide variety of additional dicarboxylic acids can be used in a minor equivalent amount (e.g. from 0 to about 20 equivalent percent of the total diacid equivalents) to prepare the reaction product, including aliphatic, cycloaliphatic, and aromatic dicarboxylic acids. Representative of such acids (which may contain from about 2 to about 22 carbon atoms) are oxalic, glutaric, malonic, adipic, succinic, suberic, sebacic, azelaic, pimelic, terephthalic, isophthalic, dodecanedioic and phthalic acids, naphthalene dicarboxylic acids, and 1,4- or 1,3-cyclohexane dicarboxylic acids. The ethoxylated alkanetriol organic compound contains predominantly species having 3 hydroxyl groups in the molecule. Examples of these include glycerol, trimethylolethane, and trimethylolpropane. Adducts of alkylene oxides with alkanetriols are known substances which may be obtained by the relevant methods of preparative organic chemistry. Ethoxylation of alcohols is extensively discussed in *Encyclopedia of Polymer Science and Technology*, vol. 6, pp. 225–273, (John Wiley & Sons, Inc. N.Y., N.Y., 1986), the disclosure of which is incorporated herein by reference. On an industrial scale, they are typically produced by ethoxylation of an alkanetriol in the presence of basic catalysts, such as for example lithium hydroxide, potassium hydroxide, sodium methylate, strontium phenolate or calcined hydrotalcite, at temperatures of 120 to 180° C. and under pressures of 1 to 5 bar. After the ethoxylation, the products may be neutralized by addition of acids (phosphoric acid, acetic acid, preferably lactic acid).

In the context of this invention, it has proved to be of particular advantage to use adducts of on average 2.1 to 3.9 moles of ethylene oxide with the alkanetriol, typically on average 2.5 moles to 3.5 moles, and more typically on average 2.8 to 3.2 moles. The trimethylolpropane 3 EO adducts are particularly preferred, this adduct having on average 2.9 to 3.1 moles of ethylene oxide. In this adduct, the predominant molecular species will contain three ethoxylate residues. Thus, the average degree of ethoxylation per hydroxyl group of the alkanetriol will be about 1. Further, the ethoxylated alkanetriol, should be essentially free of unethoxylated alkanetriols, e.g. typically less than 10 wt. % of the ethoxylated alkanetriol will be unethoxylated alkanetriol species, more typically less than 5% by weight. Thus, the reaction product as a whole will typically have less than about 2% by weight of acrylate esters of unethoxylated alkanetriol, more typically less than about 1% by weight.

The ethylenically unsaturated member selected from the group consisting of ethylenically unsaturated monocarboxylic acids and reactive derivatives thereof are typically alpha, beta-ethylenically unsaturated carboxylic acids containing from about 3 to about 8 carbon atoms. These acids contain one free carboxyl group or the chemical equivalent of a carboxyl group, such as an acid halide (e.g. chloride), anhydride, ester, salt or similar group. Preferred examples are acrylic acid, methacrylic acid, and the alkyl esters thereof wherein the alkyl group thereof has from 1 to 4 carbon atoms. Particularly preferred examples are acrylic acid and methacrylic acid. Such acids are described in "Acrylic and Methacrylic Acid Polymers", *Encyclopedia of Polymer Science and Engineering*, vol. 1, pp. 211–234 (John Wiley & Sons, Inc., N.Y., N.Y., 1985), the disclosure of which is incorporated herein by reference.

The relative amounts of the polycarboxylic acid, ethylenically unsaturated monocarboxylic acid, and ethoxylated alkanetriol can vary broadly, but will typically be essentially stoichiometric for the production of the "capped" product as discussed above. Thus, the equivalent ratios of polycarboxylic acid:ethylenically unsaturated acid:ethoxylated alkanetriol will typically be 1:0.5–1.5:2.5–3.5, more typically 1:0.8–1.2:2.7–3.3, and even more typically 1:0.9–1.1:2.9–3.1 or alternately, the equivalent ratios of polycarboxylic acid:ethylenically unsaturated acid:ethoxylated alkanetriol can be 1:0.5–2.5:2.5–3.5, more typically 1:0.8–2.3:2.7–3.3, and even more preferably 1:0.9–2.1:2.9–3.1.

A variety of process techniques can be employed in the process of the present invention. In a typical one-stage process, roughly stoichiometric quantities of the reactants (e.g. one mole of the diacid, two moles of the ethoxylated alkanetriol, and four moles of the ethylenically unsaturated monocarboxylic acid) are heated in an organic, water-entraining solvent (e.g. benzene, toluene or the like) in the presence of a radical polymerization inhibitor (e.g. hydroquinone, cuprous oxide or the like), an esterification catalyst (sulfuric acid, p-toluene-sulfonic acid or the like) and optionally an additive preventing the coloration of the products obtained (for example triphenyl phosphite or the like). The reaction can be carried out at atmospheric pressure, more typically at reduced pressure, typically at a temperature of about 65°–140° C. and for a period of about 2 to about 25 hours, more typically from about 12 to about 18 hours, with removal of the water of esterification with the aid of the solvent. The reaction is generally carried out in the presence of oxygen to inhibit polymerization of the ethylenically unsaturated acids. The reaction is carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone and other common free radical inhibitors known in the art. The level of inhibitor used is typically less than about 2000 parts per million, e.g. 100 to 1500 parts per million. The reaction is stopped as soon as the desired degree of esterification (measured in accordance with the amount of water of esterification collected or the acid value of the product) has been reached.

After having eliminated in known manner the solvent, the catalyst, excess inhibitor and any excess of ethylenically unsaturated monocarboxylic acid, a product of the present invention is obtained, which can be used, either untreated or after a suitable purification, for its various applications.

The reaction product thus obtained is a mixture of compounds having a given molecular weight distribution, as can be shown by gel permeation chromatography, the predominant species of which is the "capped" product discussed above. This one stage process is preferred. However, it is also within the scope of this invention to employ one of the following two-stage processes. In one embodiment, under esterification conditions similar to those described for the single-stage process, the ethoxylated alkanetriol is first esterified with the polycarboxylic acid, then the residual hydroxyl groups of the ethoxylated alkanetriol are esterified with the ethylenically unsaturated monocarboxylic acid. Alternatively, the ethoxylated alkanetriol is first esterified with the ethylenically unsaturated monocarboxylic acid, then the residual hydroxyl groups of the ethoxylated alkanetriol are esterified with the polycarboxylic acid. The end products obtained from the same starting materials by the different processes mentioned above present a different molecular weight distribution as can be shown by gel permeation chromatography. One type of the molecular species that will typically be present in the reaction product will be the mono-, di-, and/or tri-ester of the ethoxylated alkanetriol and the ethylenically unsaturated monocarboxylic acid alone. These species will be present in only a minor amount. It is, however, an advantage of the present invention that these species are less objectionable from a materials handling perspective as compared to the corresponding esters of an unethoxylated alkanetriol.

In the one-stage or two-stage processes described above, the free acids of the polycarboxylic acid and/or the ethylenically unsaturated monocarboxylic acid may be replaced by the halides, preferably chlorides, or anhydrides of these acids. Particularly in the case of acid halides, this makes it possible to carry out the esterification at more moderate temperatures, for example below about 40° C. In this case, it is advantageous to carry out the esterification in the presence of an acid acceptor, such as pyridine, triethylamine or the like.

In addition, the compounds of the present invention can also be obtained by transesterification of the ethoxylated alkanetriol with lower alkyl esters of the acids. In this case, the transesterification is carried out in a solvent having a sufficiently high boiling point (for example toluene or the like) to ensure that the reaction takes place at the boiling temperature of the mixture at an adequate speed and that an azeotropic mixture is formed with the lower alcohol freed by the transesterification. The rate of transesterification is monitored by measuring the amount of lower alcohol thus liberated, which is collected.

The reaction may be carried out at atmospheric pressure, although higher or lower pressures may be used. If the free acid form or the lower alkyl ester form of the acid reactants are employed, a by-product of the reaction will be water or lower alcohol, respectively. Removal of the by-product water or lower alcohol will tend to force the reaction to completion. Thus, distillation of such a by-product is one embodiment of the process of this invention.

The compound of the present invention can be applied to a variety of substrates. These include, for example, porous stock such as paper and cardboard, wood and wood products, metals such as aluminum, copper, steel, and plastics such as P.V.C., polycarbonates, acrylic and the like. After addition of a suitable photoinitiator, e.g., PHOTOMER 51® brand photoinitiator (benzyl dimethyl ketal), the compound is applied by methods such as spraying, rollcoating, flexo and gravure processes onto a selected substrate. The resulting coated substrate, e.g., a paper, is typically cured under a UV or electron beam radiation. The compound may optionally be mixed with other substances such as pigments, resins, monomers and additives such as antioxidants and rheological modifiers.

In order to further illustrate the practice of this invention, the following examples are included. All amounts, parts, ratios, and percentages in this specification and the appended claims are by weight unless noted otherwise in context.

EXAMPLE 1

Charge a reactor with 156.88 grams of the three mole ethoxylate of trimethylolpropane (eq. wt. 63.75 grams/eq.), 180.12 grams of a dimer acid (eq. wt. 282.47 grams/eq.) having a content of about 94% by wt. dimer acids, about 2.5% by wt. higher polymerized acids, and about 3.5% by wt. of monomeric fatty acids, available from Henkel Corp. as EMPOL 1008, and 91.82 grams of acrylic acid (eq. wt. 72.00), 218.69 grams of toluene, 0.13 grams of hydroquinone (200 ppm), 0.52 grams of hydroquinone monomethyl ether (800 ppm), and 3.28 grams of hypophosphorous acid. Sparge reactor with air and 25 ml/minute. Heat the reactor contents to 55–60° C. and charge 8.56 grams of para-toluenesulfonic acid (2% by wt. of combined weights of acids and ethoxylated trimethylolpropane). Heat contents of reactor to 98° C. Continue heating until rate of reaction slows as measured by collection of water of esterification. Apply mild vacuum in steps of 2 in. of Hg starting at 4–6 in. of Hg. Maintain reaction temperature at 95–98° C. Apply no vacuum greater than 16–18 in. of Hg. After 6 hours of reaction check acid value of product every 2 hours. After 10–12 hours check acid value of product every hour. Reaction is complete when acid value of the product is less than 12. Cool reactor to ambient temperature. Add toluene sufficient to make a reactant:solvent ratio of 1:1 by weight, calculated by initial batch weight less theoretical amount of water collected. Warm reactor to 40° C. Charge reactor with a solution of caustic saline (that contains 0.5 wt. % sodium hydroxide and 16 wt. % sodium chloride) in an amount equal to 20% of the batch weight less theoretical water of esterification. Mix by slow stirring for 3–5 minutes and then let phases split. Let stand at 45–50° C. for about 30 minutes and decant aqueous phase. Measure acid value of organic phase. Repeat caustic saline wash as necessary to reduce acid value to 4–5. Warm organic phase to 40° C. Charge reactor with a solution of saline (that contains 16 wt. % sodium chloride) in an amount equal to 20% of the batch weight less theoretical water of esterification. Mix by slow stirring for 3–5 minutes and then let phases split. Let stand at 45–50° C. for about 30 minutes and decant aqueous phase. Make a solution of the same amounts of hydroquinone and methyl hydroquinone as charged earlier in 5 ml of isopropanol and 5 ml of toluene. Charge to reactor and heat contents to 50° C. Sparge reactor with air at 30 ml/minute and apply vacuum to 29–30 in. of Hg to distill toluene. Increase temperature in steps to 82° C. Do not exceed 85° C. Continue distillation until toluene is less than 10 ppm by head space gas chromatography. Stir hot product with 1 wt. % filter and filter.

EXAMPLE 2

Mix 95 parts of the product of Example 1 with 2 parts of benzyl dimethyl ketal (available as PHOTOMER 51® brand photoinitiator, from Henkel Corp., Ambler, Pa.), 2 parts of alpha-hydroxy-alpha,alpha-dimethylacetophenone (available as DAROCURE 1173 brand photoinitiator from Ciba-Geigy, Hawthorne, N.Y.), and 1 part by weight triethanolamine. Cast as a 0.27 mul thick film on an aluminum panel and cure at 50 ft./min. using a 300 Watt/sq.in. UV lamp.

What is claimed is:

1. A composition polymerizable by radiation consisting essentially of
   A) a compound which consists of the reaction product of:
      a) at least one polycarboxylic member selected from the group consisting of polycarboxylic acids comprised of a diacid having more than about 12 carbon atoms and reactive derivatives thereof,
      b) at least one ethylenically unsaturated member selected from the group consisting of ethylenically unsaturated mono-carboxylic acids and reactive derivatives thereof, and
      c) at least one ethoxylated alkanetriol having an average degree of ethoxylation per hydroxyl of less than about 2 and comprised predominantly of ethoxylated alkanetriol species having one ethoxylate group per hydroxyl;
   B) at least one photoinitiator; and, optionally
   C) one or more of a pigment, a resin, a monomer, and an additive.

2. The composition of claim 1 wherein in component A) a) said diacid contains species having from about 12 to about 90 carbon atoms.

3. The composition of claim 2 wherein said diacid contains species having from about 18 to about 54 carbon atoms.

4. The composition of claim 1 wherein component A) a) is essentially completely in the form of the free acid.

5. The composition of claim 1 wherein at least about 80 eq. % of the acid equivalents in component A) a) are contributed by the diacid.

6. The composition of claim 5 wherein at least about 90 eq. % of the acid equivalents are contributed by the diacid.

7. The composition of claim 5 wherein at least about 92 eq. % to about 98 eq. % of the acid equivalents are contributed by the diacid.

8. The composition of claim 1 wherein component A) c) is derived from a member selected from the group consisting of glycerol, trimethylolethane, and trimethylolpropane.

9. The composition of claim 1 wherein said at least one ethoxylated alkanetriol in component A) c) is an adduct of on average 2.1 to 3.9 moles of ethylene oxide with said alkanetriol.

10. The composition of claim 1 wherein said at least one ethoxylated alkanetriol in component A) c) is an adduct of on average 2.5 to 3.5 moles of ethylene oxide with said alkanetriol.

11. The composition of claim 1 wherein said at least one ethoxylated alkanetriol in component A) c) is an adduct of on average 2.9 to 3.1 moles of ethylene oxide with said alkanetriol.

12. The composition of claim 11 wherein said at least one ethoxylated alkanetriol is an ethoxylated trimethylolpropane.

13. The composition of claim 1 wherein said at least one ethoxylated alkanetriol in component A) c) is essentially free of unethoxylated alkanetriols.

14. The composition of claim 1 wherein said at least one ethoxylated alkanetriol in component A) c) contains less than about 10 wt. % of unethoxylated alkanetriol species.

15. The composition of claim 1 wherein said at least one ethoxylated alkanetriol in component A) c) contains less than about 5 wt. % of unethoxylated alkanetriol species.

16. The composition of claim 1 wherein the component A) reaction product has less than about 2% by weight of acrylate esters of unethoxylated alkanetriol.

17. The composition of claim 16 wherein said reaction product has less than about 1% by weight of acrylate esters of unethoxylated alkanetriol.

18. The composition of claim 1 wherein said at least one ethylenically unsaturated member in component A) b) is selected from the group consisting of alpha, beta-ethylenically unsaturated carboxylic acids containing from about 3 to about 8 carbon atoms.

19. The composition of claim 1 wherein said at least one ethylenically unsaturated member in component A) b) is selected from the group consisting of acrylic acid, methacrylic acid, and the alkyl esters thereof wherein the alkyl group thereof has from 1 to 4 carbon atoms.

20. The composition of claim 1 wherein said at least one ethylenically unsaturated member in component A) b) is selected from the group consisting of acrylic acid and methacrylic acid.

21. The composition of claim 1 wherein the equivalent ratio of component A) a): component A) b): component A) c) is about 1:0.5–1.5:2.5–3.5.

22. The composition of claim 21 wherein the equivalent ratio is about 1:0.8–1.2:2.7–3.3.

23. The composition of claim 21 wherein the equivalent ratio is about 1:0.9–1.1:2.9–3.1.

24. The composition of claim 1 wherein the component A) reaction product is the product of a one-stage reaction process.

25. A composition polymerizable by radiation consisting essentially of
   A) a compound which consists of the reaction product of:
      a) at least one polycarboxylic member selected from the group consisting of polycarboxylic acids comprised of a diacid having from about 18 to about 54 carbon atoms, wherein said polycarboxylic member is essentially completely in the form of the free acid and wherein at least about 80 eq. % of the acid equivalents of the polycarboxylic acid are contributed by the diacid,
      b) at least one ethylenically unsaturated member selected from the group consisting of acrylic acid an methacrylic acid, and
      c) at least one ethoxylated alkanetriol in which the alkanetriol is selected from the group consisting of glycerol, and trimethylolethane, said ethoxylated alkanetriol having an average degree of ethoxylation per hydroxyl of about 0.7 to about 1.3 and comprised predominantly of ethoxylated alkanetriol species having one ethoxylate group per hydroxyl, wherein the equivalent ratio of component A) a): component A) b): component A) c) is about 1:0.8–2:2.7–3.3;
   B) at least one photoinitiator; and, optionally
   C) one or more of a pigment, a resin, a monomer, and an additive.

26. The composition of claim 25 wherein component A) c) is an ethoxylated trimethylolpropane.

27. A method of coating a substrate comprising polymerizing with radiation the composition according to claim 1 while said composition is in contact with a substrate.

28. The composition of claim 1 wherein the equivalent ratio of component A) a): component A) b): component A) c) is about 1:0.5–2.5:2.5–3.5.

29. The composition of claim 28 wherein the equivalent ratio is about 1:0.8–2.3:2.7–3.3.

30. The composition of claim 28 wherein the equivalent ratio is about 1:0.9–2.1:2.0–3.1.

* * * * *